Oct. 28, 1941.　　F. KLEIN ET AL　　2,260,978
ENGINE SUPPORT
Filed March 7, 1939　　3 Sheets-Sheet 1

Inventor:
FRIEDRICH KLEIN
KONRAD EICHHOLZ
By: Richards & Geier
Attorneys:

Inventor:
FRIEDRICH KLEIN
KONRAD EICHHOLZ
Attorneys

Patented Oct. 28, 1941

2,260,978

UNITED STATES PATENT OFFICE 2,260,978

ENGINE SUPPORT

Friedrich Klein and Konrad Eichholtz, Dessau, Germany, assignors to Junkers Flugzeug-und-Motorenwerke, A. G., Dessau, Dessau, Germany, a corporation of Germany Application March 7, 1939, Serial No. 260,309
In Germany March 14, 1938

2 Claims. (Cl. 248—5)

This invention relates to motor supports, and refers more particularly to supporting means connecting a motor or engine of an airship or the like to the body of the latter.

Some of the engine supports or installations known in the art comprise resilient or elastic members made, for example, of rubber, which are interposed between the main body of the airship and its motor, and which provide a certain limited freedom of movement between the motor and the fuselage or that part of the airship body which has to absorb the various forces caused by the motor, such as weight, acceleration forces, propeller thrust, and the like.

Heretofore, such resilient or elastic members were built into the supports or struts of the supporting device which received the motor, with the result that their construction had to depend upon the particular structure of the engine support or installation.

An object of the present invention is to overcome this disadvantage and to provide a device wherein the construction and size of elastic members does not depend upon that of the support, so that the same elastic members may be used for the same engine even if differently constructed engine supports are being utilized, said elastic members affording the engine the required freedom of movement.

Another object is to provide resilient or elastic members which will afford any predetermined engine the same required freedom of movement independently of the form of the engine support.

A further object is the provision of an engine support having resilient or elastic members of the described type which will afford the engine a freedom of movement or degree of freedom in six different directions, namely, in the directions of three perpendicular axes (i. e. in the directions of its length, width and height), as well as rotary movements around these axes.

Other objects of the present invention will be apparent in the course of the following specification.

The objects of the present invention may be realized through the provision of elastic members located between the junction points of the engine and the junction points of the supporting device intended for connection to the engine, said elastic members affording to these junction points a limited relative freedom of movement or of shifting in all directions lying within a single plane, which is hereinafter designated as the oscillatory plane.

It is advantageous to construct the device in such manner that the oscillatory plane extends at right angles to a radius passing through the center of the engine axle and the corresponding junction point of the engine. The oscillatory planes of the individual junction points should not lie all in one plane or all extend parallel to each other, but at least two of the oscillatory planes must extend at an angle to each other, while the oscillatory plane of a third junction point should not coincide with the oscillatory planes of the first junction point or the second junction point.

Consequently, each junction point of the engine is provided with a separate elastic member and two of the struts of the supporting device are, preferably, connected to this elastic member, the opposite ends of the struts being pivotally connected to the fuselage or the ship body in such manner that the struts can swing about an axis which is at least substantially parallel to the oscillatory plane of the elastic member connected with these struts.

The pair of struts may be replaced by a rigid plate which is pivotally connected to the motor-supporting body, so that it can swing about an axis lying within the plane of the plate, while the free projecting end of the plate is attached to the motor.

It is necessary to provide at least three elastic members for the purpose of connecting the engine to its support, and, therefore, at least three pairs of struts or three rigid plates pivotally connected to the supporting body should be used.

The described device may be used for any types of engines, for example, it may be used for radial type engines, as well as for series engines.

The invention will appear more clearly from the following detailed description when taken in connection with the accompanying drawings, showing by way of example preferred embodiments of the inventive idea.

Figure 1:
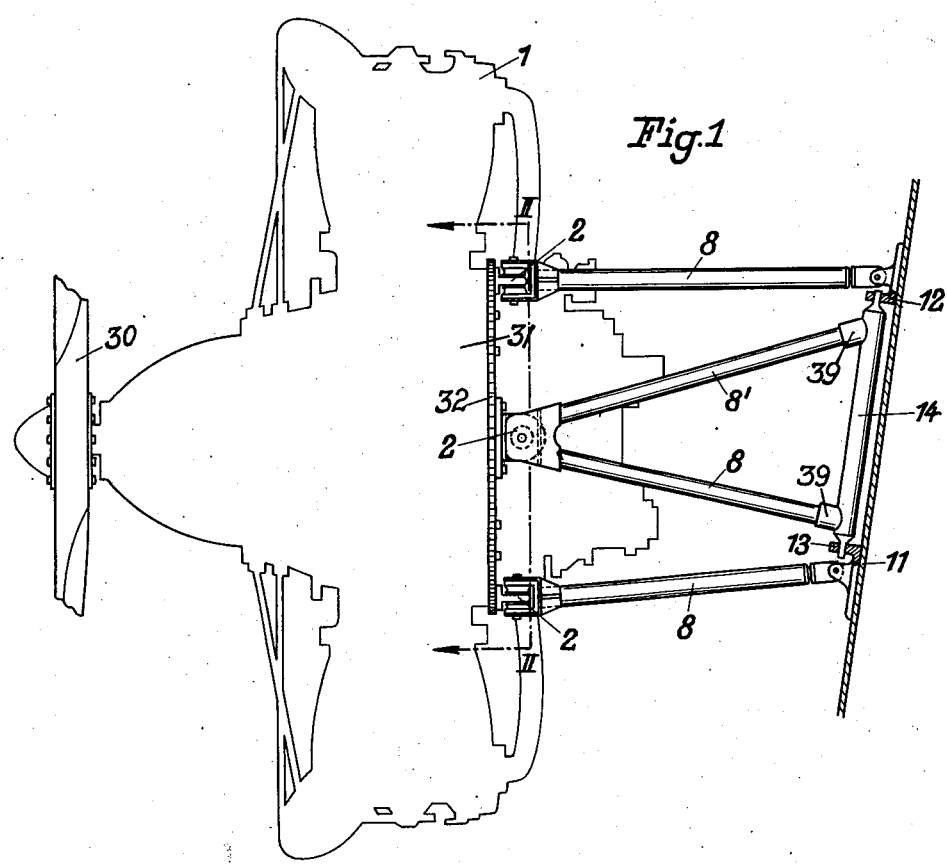
Figure 1 shows diagrammatically and in side elevation a portion of a ship body and a radial type engine carried thereby and having four junction points.
Figure 2:
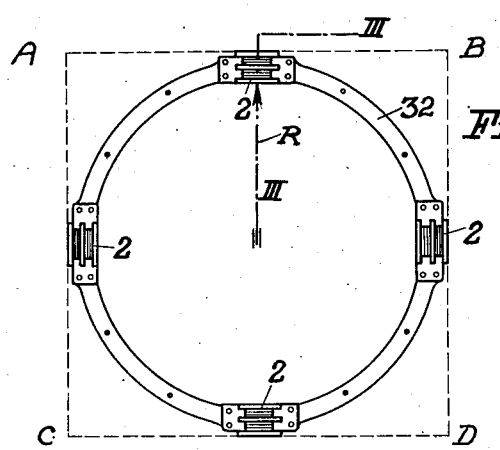
Figure 2 is a section along the line II—II of Figure 1.
Figure 3:
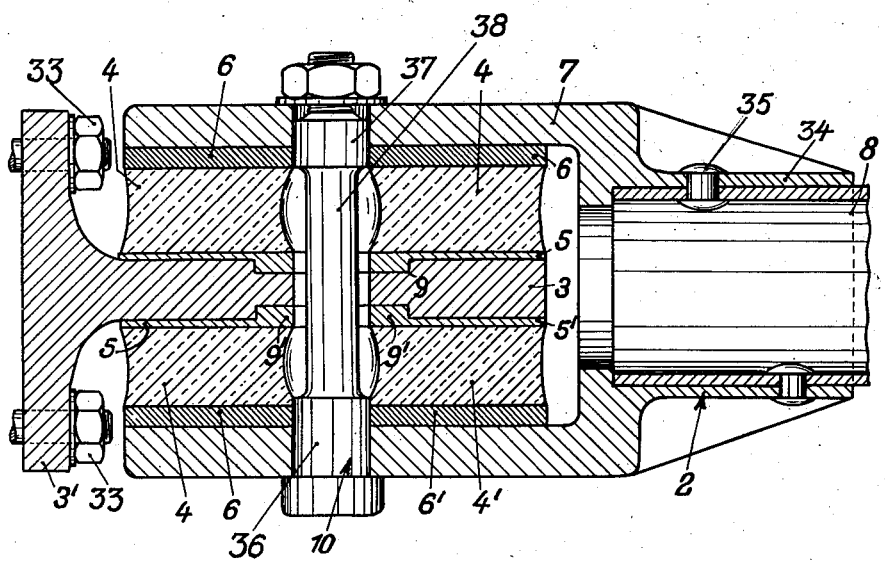
Figure 3 is a section through an elastic member along the line III—III of Figure 2 on an enlarged scale.

The device shown in Figures 1 to 3 of the drawings comprises an engine 1 of the radial type, carrying a propeller 30 and provided with a crank case 31 having a rear wall 32. As shown in Figure 2, four elastic connecting devices 2 are provided upon the wall 32 of the motor 1 and are symmetrically disposed on opposite sides of the central axis of the motor 1. Each of the elastic devices is substantially similar to the others, so that only one of them will be described in detail hereinafter.

The elastic connecting device shown in section in Figure 3 encloses a flange 3 of a plate 3' connected to the wall 32 by the bolts 33. An elastic member 4, which may consist of a rubber disc or the like, is situated upon one side of the flange 3. Another rubber disc 4' is located on the opposite side of the flange 3. The disc 4 is covered by plates 5 and 6, which are firmly attached to it by vulcanization or the like. The rubber disc 4' is firmly connected with corresponding plates 5' and 6'.

A bifurcated head piece or casing 7 encloses the elastic members 4 and 4' and is provided with a flange portion 34 which is connected by the rivets 35 with one end of a strut 8, constituting a part of the engine support.

The casing 7 is connected with the elastic members 4 and 4' by a bolt 10, which extends through openings formed in the casing 7, the rubber discs 4 and 4', the cover plates 5, 5', 6 and 6', and the flange 3. The bolt 10 is provided with cylindrical portions 36 and 37, which fit into the openings formed in the opposite walls of the casing 7 and in the cover plates 6 and 6'. On the other hand, the central portion 38 of the bolt 10 is smaller in diameter than the openings formed in the elastic plates 4 and 4', the cover plates 5 and 5', and the flange 3.

The cover plate 5 is provided with an inner flange or shoulder 9 which fits into a corresponding recess formed in the flange 3. The opposite surface of the flange 3 is provided with a similar recess which is filled by a shoulder 9' constituting a part of the cover plate 5'.

The shearing forces, which act between the flange 3 and the casing 7 in the direction of the oscillatory plane, are thus transmitted by the shoulders 9 and 9' from the flange 3 to the covers 5 and 5', the elastic discs 4 and 4', and the cover plates 6 and 6', and are thence transmitted by the bolt 10 to the casing 7. Due to the elasticity of the discs 4 and 4' and the play between the bolt 10 on the one hand, and the flange 3 and the cover plates 5 and 5' on the other, the flange 3 and the casing 7 may move relatively to each other in the direction of their contacting surfaces. Furthermore, due to the elasticity of rubber of which the discs 4 and 4' are made, the described device is yieldable in a direction perpendicular to the direction of the contacting surfaces and there is the possibility of a certain swinging movement about the center of the connecting plate or flange 3.

As shown in Figure 1, each of the elastic connecting devices 2 is connected to two struts 8, the opposite ends of which are attached to a wall 11 constituting a part of the fuselage. The two ends of the struts 8 are firmly enclosed by suitable flanges 39 of a tubular axle 14, the two ends of which are rotatably supported in bearings 12 and 13 attached to the wall 11. Due to this arrangement, the two struts 8 may swing around the central axis of the axle 14. The axle 14 extends in a direction substantially parallel to that of the oscillatory plane of the corresponding elastic connecting device 2.

As shown in Figure 2, each oscillatory plane extends at right angles to the radius R, and the four oscillatory planes do not all extend in one plane nor are all parallel to one another.

Figure 4:
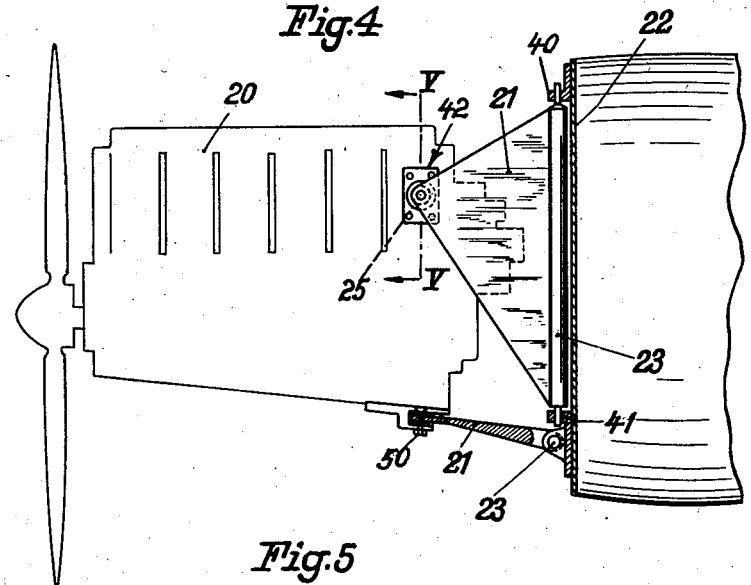
Figure 4 illustrates diagrammatically a series engine having three junction points and a portion of the ship body carrying the engine.
Figure 5:
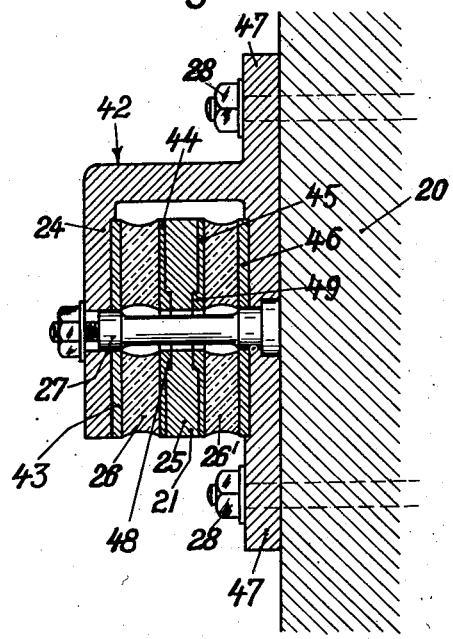
Figure 5 is a section through an elastic member along the line V—V of Figure 4 on an enlarged scale.

The device shown in Figures 4 and 5 comprises a series engine 20 connected with a wall 22 of a ship body by three substantially triangularly shaped plates 21, two of which are shown in Figure 4. Each of the plates 21 serves as a substitute for a pair of struts 8, shown in Figure 1.

Each plate 21 is firmly connected with an axle 23, the two ends of which are rotatably supported by bearings 40 and 41 attached to the wall 22.

Each axle 23 extends in a direction substantially parallel to the oscillatory plane of a separate elastic connecting device 42. Each of the plates 21 is attached to a separate elastic device 42, so that there are in all three devices 42, two of which are located along the longitudinal sides of the motor casing, while the third one is situated at the front portion of the lower surface of the casing.

One of the elastic supporting devices 42 is shown in greater detail in Figure 5 and comprises two rubber discs 26 and 26' carrying cover plates 43 and 44, and 45 and 46, respectively.

In this construction, the central member 25 constitutes the head portion of the supporting plate 21. The bifurcated head piece or casing 24 is provided with flanges 47 attached by the bolts 28 to the casing of the engine 20. The cover plates 44 and 45 are provided with shoulder portions 48 and 49, respectively, which fit into corresponding recesses formed in the portion 25 of the plate 21. A bolt 27 fits snugly into openings formed in the casing 24 and the plates 43 and 46, and extends through openings provided in the plates 26, 44, 21, 45 and 26'.

Thus the shearing forces are transmitted in this construction in substantially the same manner as in the construction shown in Figure 3.

It is apparent that in each of the illustrated constructions, the engine has a freedom of movement in relation to its supporting body in six different directions, since the engine may be shifted within certain limits not only in the direction of each one of the three main axes, but may also turn somewhat in planes perpendicular to these three axes. Furthermore, the form and the size of each of the elastic connecting devices is made independent of the form or construction of the engine supports carried by the ship body. Therefore, the same elastic connecting devices may be used whenever the same engine is to be attached to differently constructed supports.

It is apparent that the specific illustrations shown above have been given by way of illustration and not by way of limitation, and that the structures above described are subject to wide variation and modification without departing from the scope or intent of the invention, all of which variations and modifications are to be included within the scope of the present invention.

What is claimed is:

1. In a device connecting an engine to a supporting body and having a plurality of supporting elements, means pivotally connecting each of said supporting elements to said supporting body and connecting elements attached to the engine; means connecting each supporting element to a separate connecting element and comprising two rubber discs situated on both sides of one of these elements, cover plates situated on both sides of each of said rubber discs to form outer cover plates and inner cover plates, one of said elements having a bifurcated end embracing said rubber discs and cover plates, and a bolt extending perpendicularly to the first-mentioned means through openings formed in said rubber discs, cover plates, said bifurcated end of one of the elements, and the other element and being in frictional engagement with said bifurcated end and the outer cover plates, while extending with play through the other element, the rubber discs and the inner cover plates.

2. In a device connecting an engine to a supporting body and having a plurality of supporting elements, means pivotally connecting each of said supporting elements to said supporting body and connecting elements attached to the engine; means connecting each supporting element to a separate connecting element and comprising rubber discs situated on both sides of one of these elements, the other element having means embracing said rubber discs and said one element, and a bolt extending through openings formed in said rubber discs, the disc-embracing means and said one element and being secured to the disc-embracing means, while extending with play through said one element and the rubber discs.

FRIEDRICH KLEIN.
KONRAD EICHHOLTZ.